United States Patent
Xu et al.

(10) Patent No.: US 12,323,689 B1
(45) Date of Patent: Jun. 3, 2025

(54) LIGHTED CAMERA APPARATUS

(71) Applicant: SimpliSafe, Inc., Boston, MA (US)

(72) Inventors: Monica Xu, Cambridge, MA (US);
Shelby Poon, Quincy, MA (US);
Shekhar Sastry, Arlington, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/888,706

(22) Filed: Sep. 18, 2024

(51) Int. Cl.
*H04N 23/56* (2023.01)
*H04N 23/51* (2023.01)
*H04N 23/667* (2023.01)

(52) U.S. Cl.
CPC ............. *H04N 23/56* (2023.01); *H04N 23/51* (2023.01); *H04N 23/667* (2023.01)

(58) Field of Classification Search
None
See application file for complete search history.

(56) References Cited

U.S. PATENT DOCUMENTS

| | | | | |
|---|---|---|---|---|
| 2014/0240466 A1* | 8/2014 | Holz | ........................ | G06T 7/70 348/47 |
| 2021/0027590 A1* | 1/2021 | Lin | ........................ | G06T 7/11 |
| 2023/0052553 A1* | 2/2023 | Wang | ..................... | G06V 10/82 |
| 2024/0142628 A1* | 5/2024 | Okuyama | .............. | H04N 23/45 |
| 2024/0289569 A1* | 8/2024 | Barish | ................... | G06K 7/1417 |

OTHER PUBLICATIONS

Dedeoglu, "Moving object detection, tracking and classification for smart video surveillance" (Year: 2004).*

* cited by examiner

*Primary Examiner* — Eileen M Adams
(74) *Attorney, Agent, or Firm* — Finch & Maloney PLLC

(57) ABSTRACT

In one example, a device includes an image sensor and a light source positioned relative to the image sensor so that light from the light source is reflected away from the image sensor by first objects that are within a field of view of the image sensor, the first objects being positioned less than a selected distance from the image sensor. In an example, the device further includes at least one processor and a data storage device storing instructions that when executed by the at least one processor cause the device to acquire, with the image sensor, at least one image of a scene based on reflections of the light from the light source, the at least one image depicting a second object but not the first objects, the second object being positioned further from the image sensor than the selected distance.

20 Claims, 14 Drawing Sheets

LIGHTED CAMERA APPARATUS

TECHNICAL FIELD

Aspects of the technologies described herein relate to imaging systems and methods, more particularly, to motion-sensitive cameras and systems and methods utilizing the same.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

Aspects and examples are directed to techniques for reducing (1) distortion of images due to reflections of light caused by illumination of particles in the air; and (2) false positive motion events otherwise caused by detection of small objects.

According to one example, a device comprises an image sensor; a light source positioned relative to the image sensor so that light from the light source is reflected away from the image sensor by first objects that are within a field of view of the image sensor, the first objects being positioned less than a selected distance from the image sensor; at least one processor; and a data storage device storing instructions that when executed by the at least one processor cause the device to acquire, with the image sensor, at least one image of a scene based on reflections of the light from the light source, the at least one image depicting a second object but not the first objects, the second object being positioned further from the image sensor than the selected distance.

According to another example, a method comprises illuminating an area within a field of view of an image sensor using a light source, the image sensor being part of a device that includes the light source, and the light source being positioned with respect to the image sensor so that light from the light source is reflected away from the image sensor by first objects that are positioned within a field of view of the image sensor and less than a selected distance from the image sensor, acquiring, based on reflections of the light from the light source received by the image sensor, a one or more images from the image sensor, the one or more images depicting a second object but not the first objects, and detecting the second object based on at least one of the plurality of images, the second object being further from the image sensor than the selected distance.

According to another example, a device comprises a housing, an image sensor disposed at least partially within the housing, and a light source disposed at least partially within the housing or attached to the housing, the light source configured to emit light to illuminate at least a portion of a field of view of the image sensor, wherein the image sensor is configured to acquire images of first objects within the field of view based on receiving reflections of the light by the first objects, and wherein the light source is, positioned relative to the image sensor such that reflections of the light by second objects that are within the field of view of the image sensor and positioned less than a threshold distance from the image sensor are not received by the image sensor.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular aspect, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this disclosure. However, the figures are not intended as a definition of the limits of any particular example. The figures, together with the remainder of this disclosure, serve to explain principles and operations of the described and claimed aspects. In the figures, the same or similar components that are illustrated are represented by a like reference numeral. For purposes of clarity, every component may not be labeled in every figure. In the figures:

DETAILED DESCRIPTION

Figure 1:
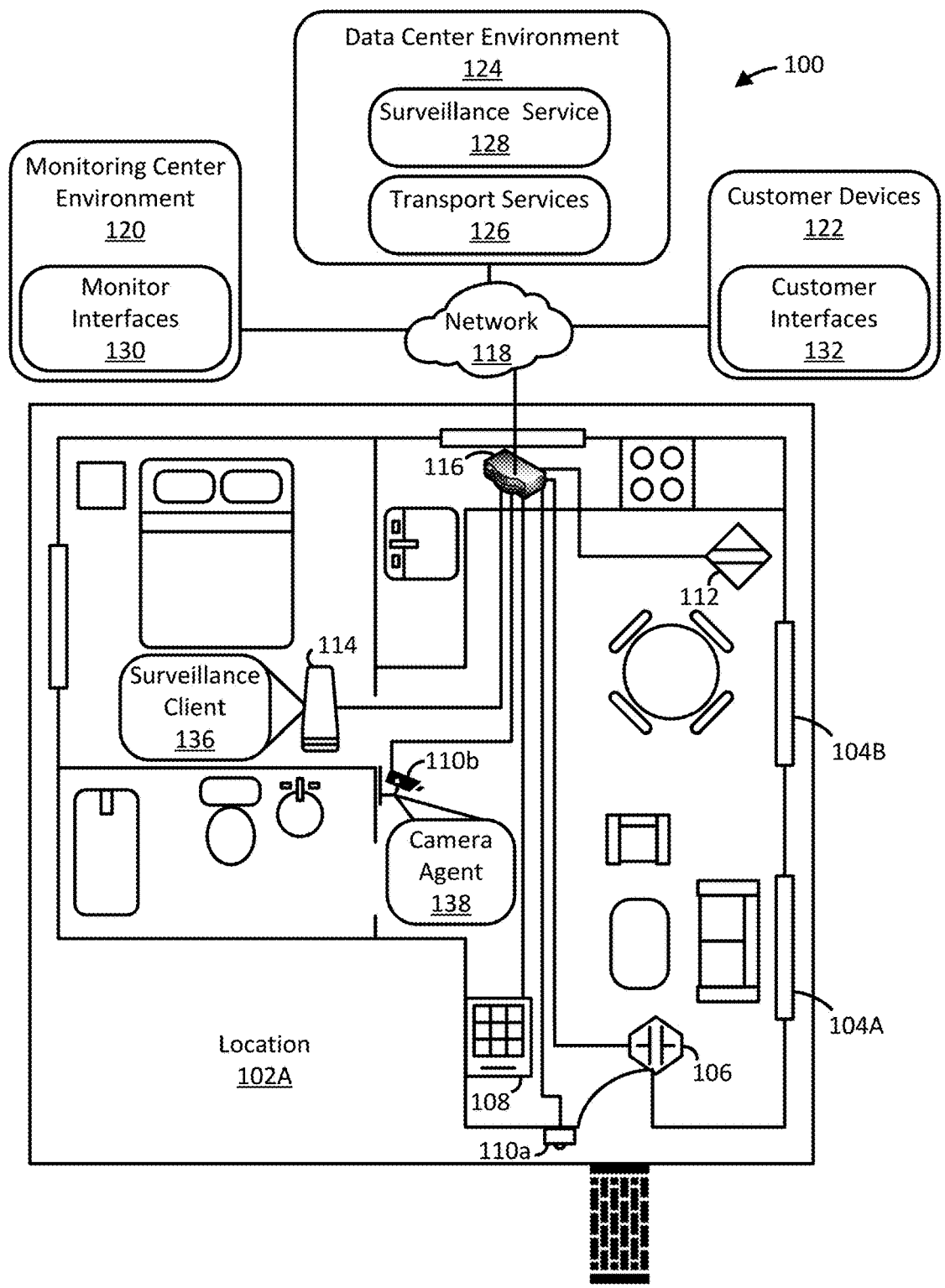
FIG. 1 is a schematic diagram of a security system, according to some examples described herein.

Systems (e.g., smart home systems and/or security systems) can include a range of sensors configured to detect various events or conditions, such as motion, moisture, temperature changes, and sounds, among others. For example, imaging sensors can include a camera that captures still and/or video images of a scene within a field of view of the camera. The field of view of the camera corresponds to the extent of the observable world that is "seen" at any given moment by the image capture device, which is generally the solid angle through which the camera is sensitive to electromagnetic radiation.

Some image analysis (e.g., motion detection) includes identifying differences in consecutive image frames to make a determination about content of an image (e.g., to determine which regions of the image are representative of a moving object. However, this type of analysis is sensitive or otherwise susceptible to small particles near the camera, such as dust, rain, and/or snow, for example, that can distort the image and adversely affect results of the analysis. For instance, in motion detection systems during low-light conditions, such as night-time, for example, a light source, such as one or more light emitting diodes (LEDs), positioned near the camera can be used to emit light to make the scene visible. However, this can also increase visibility of small particles. As a result, without mitigation, these small particles within the camera field of view can be detected, causing image distortion that can be interpreted as false positive instances of motion detection. In some applications, a motion event (e.g., motion detected based on image processing as described above) causes the camera, and/or one or more other devices in a system, to perform additional actions, such as transmitting a notification to a user device, recording a video stream, and/or generating an alarm condition.

Image distortion is undesirable for several reasons. For example, the quality and/or usability of the image is negatively impacted by inadvertent reflected light being shown in the images. Such distortion limits the usability of images to aid in subsequent determinations or analyses. Also, in the security system context, image distortion can lead to many false positive notifications can be annoying and disquieting for a user of the system. False positive motion events can also cause the system to use more power because a high rate of false positive motion events can cause the electronics of the system, including those that consume relatively high power, such as processors and transmitters, for example, to be active more of the time. This is undesirable in general for environmental and energy-efficiency reasons, and can be even more problematic for battery-powered security sensors where unnecessary activity can shorten the battery life.

Accordingly, techniques are disclosed herein for reducing the sensitivity of an image capture device (e.g., a camera) to image distortion caused by reflected light from small objects. As described further below, according to certain examples, a methodology is provided for repositioning a light source with respect to a camera such that the scene (including people and/or other objects of interest) remains illuminated, but small objects become less visible. For example, by moving the light source further away from the camera, the angle of incident light decreases, thereby reducing the visibility of small objects very close to the camera (e.g., dust, precipitation, etc.), while maintaining visibility of larger objects further away from the camera (e.g., people, vehicles, etc.). This can improve image quality and the accuracy of analysis of the image (e.g., improving motion detection of systems by reducing false positives caused by small objects). Techniques described herein may provide advantages for any camera that captures images in low light settings (and thus operates in conjunction with an associated light source), including outdoor, indoor, and doorbell cameras, for example.

Examples of the techniques disclosed herein can be implemented in a camera system that includes an image sensor for acquiring images of a scene and a light source for illuminating the scene. The image sensor may be part of an image capture device. The light source may be integrated with the image capture device, attached to the image capture device, or separate from the image capture device. In some examples, the light source is positioned relative to the image sensor such that an angle of incidence of light emitted by the light source at a first set of objects (e.g., rain or snow precipitation) within a field of view of the image sensor and positioned less than a selected distance from the image sensor is greater than or equal to a threshold angle of incidence at which reflections of the light from the first objects are orthogonal to the field of view of the image sensor. In operation, the camera system can be configured to acquire two or more images of the scene using the image sensor, and process at least two images of the two or more images to detect motion of a second object (e.g., a person) within the field of view of the image sensor, the second object being further from the image sensor than the selected distance. Detection of the motion of the second object can be accomplished without detecting motion of the first objects.

These and other aspects and examples are discussed in more detail below.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

As described above, lighted camera systems (e.g., systems including a camera and a light source that provides primary illumination for at least a portion of the field of view of the camera) can be used in variety of applications, including in security systems, monitoring systems, or smart home systems, for example, and/or other systems in which it is desirable to provide illumination for the camera. FIG. 1 is a schematic diagram of a system 100 configured to monitor geographically disparate locations in accordance with some examples. The system 100 may be a security system or smart home system, for example. As shown in FIG. 1, the system 100 includes various devices disposed at a monitored location 102A, a monitoring center environment 120, a data center environment 124, one or more customer devices 122, and a communication network 118. Each of the monitoring center environment 120, the data center environment 124, the one or more customer devices 122, and the communication network 118 include one or more computing devices (e.g., as described below with reference to FIG. 11). Some or all of the devices disposed at the monitored location 102A may also include one or more computing devices. The one or more customer devices 122 are configured to host one or more customer interface applications 132. The monitoring center environment 120 is configured to host one or more monitor interface applications 130. The data center environment 124 is configured to host a surveillance service 128 and one or more transport services 126. In some examples, devices at the monitored location 102A include one or more image capture devices 110 (individually identified as image capture devices 110*a* and 110*b* in FIG. 1), a contact sensor assembly 106, a keypad 108, a motion sensor assembly 112, a base station 114, and a router 116. The base station 114 hosts a surveillance client 136. The image capture device 110 hosts a camera agent 138. The devices disposed at the monitored location 102A (e.g., devices 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the monitored location 102A by way of example only. Other networking technology that involves other computing devices is suitable for use within the location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc.). Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the monitored location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the monitored location 102A support other communication protocols, such as MQTT or other IoT protocols.

The data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

In some examples, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 106, 110, and 112 are configured to acquire analog signals via sensors incorporated into the devices, generate digital sensor data based on the acquired signals, and communicate (e.g. via a wireless link with the router 116) the sensor data to the base station 114. The type of sensor data generated and communicated by these devices varies along with the type of sensors included in the devices. For instance, the image capture devices 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. Where the image capture devices 110 have sufficient processing capacity and available power, the image capture devices 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device 100*a* has a field of view (FOV) that originates proximal to a front door of the location 102A and can acquire images of a walkway, highway, and a space between the location 102A and the highway. The image capture device 110*b* has an FOV that originates proximal to a bathroom of the location 102A and can acquire images of a living room and dining area of the location 102A. The image capture device 110*b* can further acquire images of outdoor areas beyond the location 102A through windows 104A and 104B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIGS. 4B and 4C). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate, to the base station 114, sensor data indicating whether the front door of the location 102A is open or closed. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of sensor data indicating changes in temperature rather than changes in reflected sound waves.

In some examples, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This aspect can prevent a "crash and smash" robbery from being successfully executed. Further example processes that the surveillance service 128 is configured to execute are described below with reference to FIGS. 5 and 6.

In some examples, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the monitor interface 130 controls its host device to interact with a user to configure aspects of the system 100. It should be noted that, in at least some examples, the monitor interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures aspects of the system 100 in response to input from a user.

Figure 2:
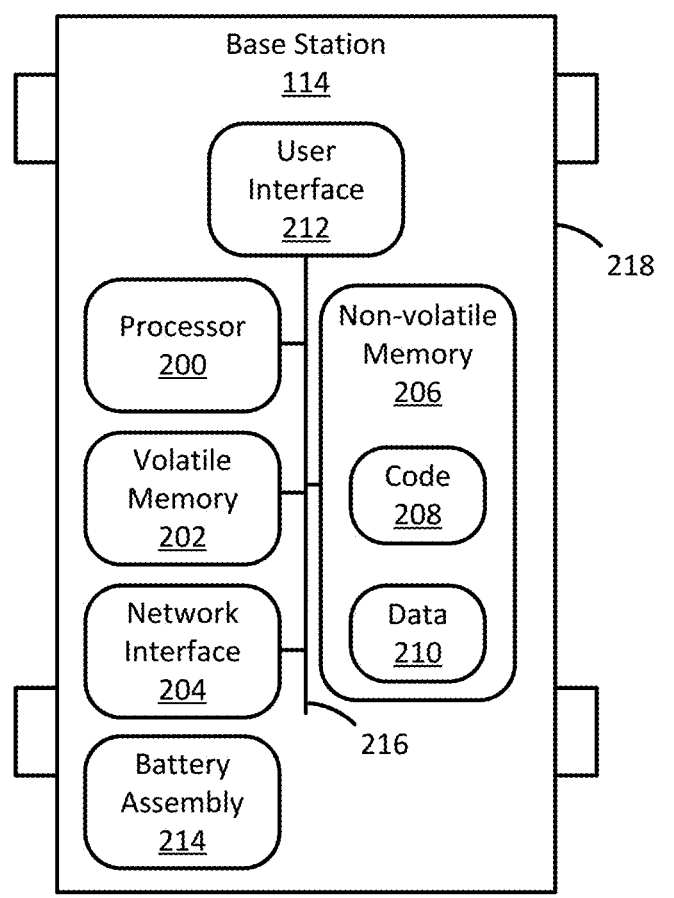
FIG. 2 is a schematic diagram of a base station, according to some examples described herein.

Turning now to FIG. 2, an example of a base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the components of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing with the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g. memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit messages to other location-based devices. These messages can include wake messages to request streams of sensor data, alarm messages to trigger alarm responses, or other messages to initiate other operations. Bands that the network interface 204 may utilize for sub-GHz wireless networking include, for example, an 868 MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 dB siren that the processor 200 sounds to indicate that a break-in event has been detected.

Continuing with the example of FIG. 2, the various components of the base station 114 described above can communicate with one another via the interconnection mechanism 216. In some examples, the interconnection mechanism 216 includes a communications bus. In addition, in some examples, the battery assembly 214 is configured to supply operational power to the various components of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Figure 3:
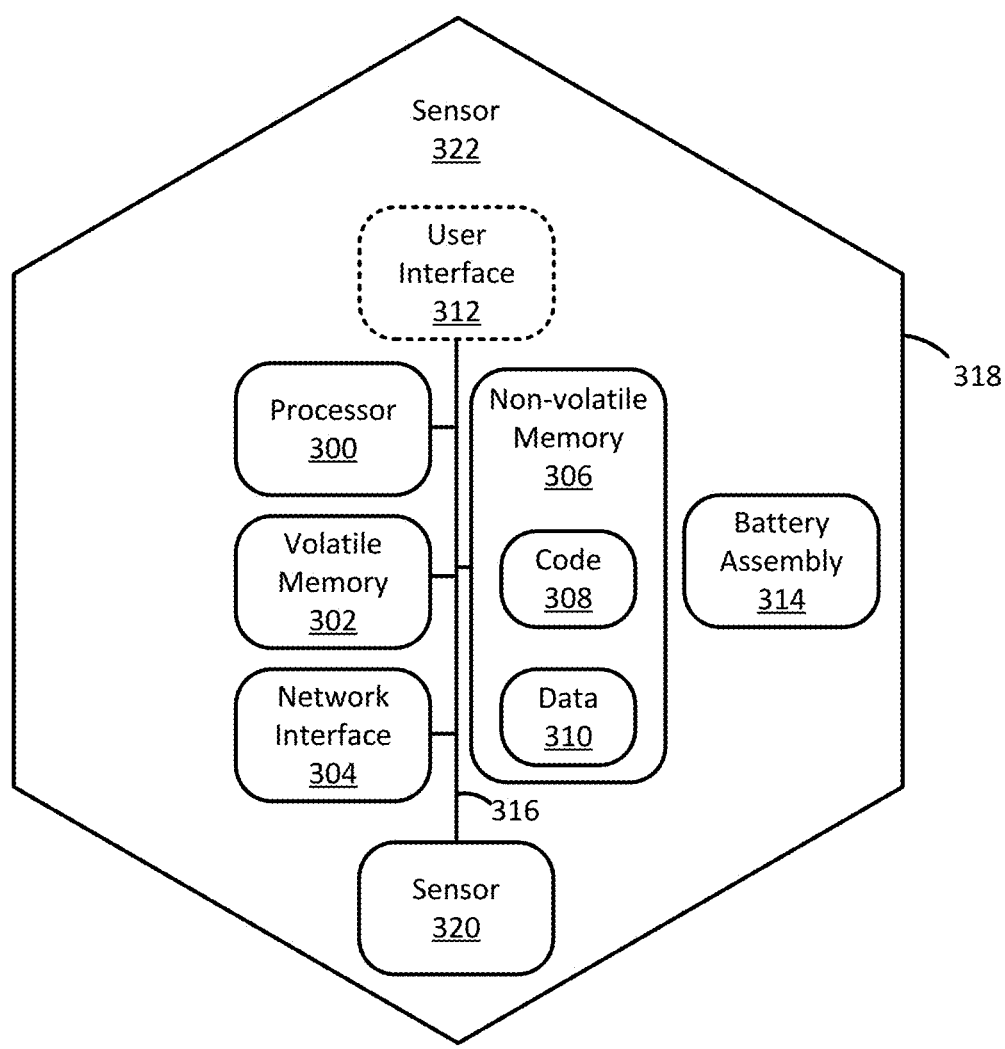
FIG. 3 is a schematic diagram of a security sensor, according to some examples described herein.

Turning now to FIG. 3, an example of a sensor 322 is schematically illustrated. Particular configurations of the sensor 322 (e.g., the image capture device 110, the motion sensor assembly 112, and the contact sensor assemblies 106) are illustrated in FIG. 1 and described above. Other examples of sensors 322 include glass break sensors, carbon monoxide sensors, smoke detectors, water sensors, temperature sensors, and door lock sensors, to name a few. As shown in FIG. 3, the sensor 322 includes at least one processor 300, volatile memory 302, non-volatile memory 306, at least one network interface 304, a battery assembly 314, an interconnection mechanism 316, and at least one sensor assembly 320. The non-volatile memory 306 stores executable code 308 and a data store 310. Some examples include a user interface 312. In certain examples illustrated by FIG. 3, the components of the sensor 322 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314, respectively, with reference to the sensor 322. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio (including an antenna), an ethernet port, a USB port, etc.) and a software stack including drivers and/or other code 308 that is configured to communicate with the one or more physical interfaces to support one or more LAN, PAN, and/or WAN standard communication protocols. The communication protocols can include, for example, TCP, UDP, HTTP, and MQTT among others. As such, the network interface 304 enables the sensor 322 to access and communicate with other computing devices (e.g., the other location-based devices) via a computer network (e.g., the LAN established by the router 116 and/or a point-to-point connection). For instance, in at least one example, when executing the code 308, the processor 300 controls the network interface to stream (e.g., via UDP) sensor data acquired from the sensor assembly 320 to the base station 114. Alternatively or additionally, in at least one example, through execution of the code 308, the processor 300 can control the network interface 304 to enter a power conservation mode by powering down a 2.4 GHz radio and powering up a sub-GHz radio that are both included in the network interface 304. In this example, through execution of the code 308, the processor 300 can control the network interface 304 to enter a streaming or interactive mode by powering up a 2.4 GHz radio and powering down a sub-GHz radio, for example, in response to receiving a wake signal from the base station via the sub-GHz radio.

Continuing with the example of FIG. 3, through execution of the code 308, the processor 300 can control operation of the user interface 312. In some examples, the user interface 312 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 308 that is configured to communicate with the user input and/or output devices. As such, the user interface 312 enables the sensor 322 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 are accessible and/or visible as part of, or through, the housing 318.

The sensor assembly 320 can include one or more types of sensors, such as the sensors described above with reference to the image capture devices 110, the motion sensor assembly 112, and the contact sensor assembly 106 of FIG. 1, or other types of sensors. For instance, in at least one example, the sensor assembly 320 includes an image sensor (e.g., a charge-coupled device or an active-pixel sensor) and a temperature or thermographic sensor (e.g., an active and/or passive infrared (PIR) sensor). Regardless of the type of sensor or sensors housed, the processor 300 can (e.g., via execution of the code 308) acquire sensor data from the housed sensor and stream the acquired sensor data to the processor 300 for communication to the base station.

It should be noted that, in some examples of the devices 108 and 322, the operations executed by the processors 200 and 300 while under control of respective control of the code 208 and 308 may be hardcoded and/or implemented in hardware, rather than as a combination of hardware and software. Moreover, execution of the code 308 can implement the camera agent 138 of FIG. 1 and can result in manipulated data that is a part of the data store 310.

Figure 4A:
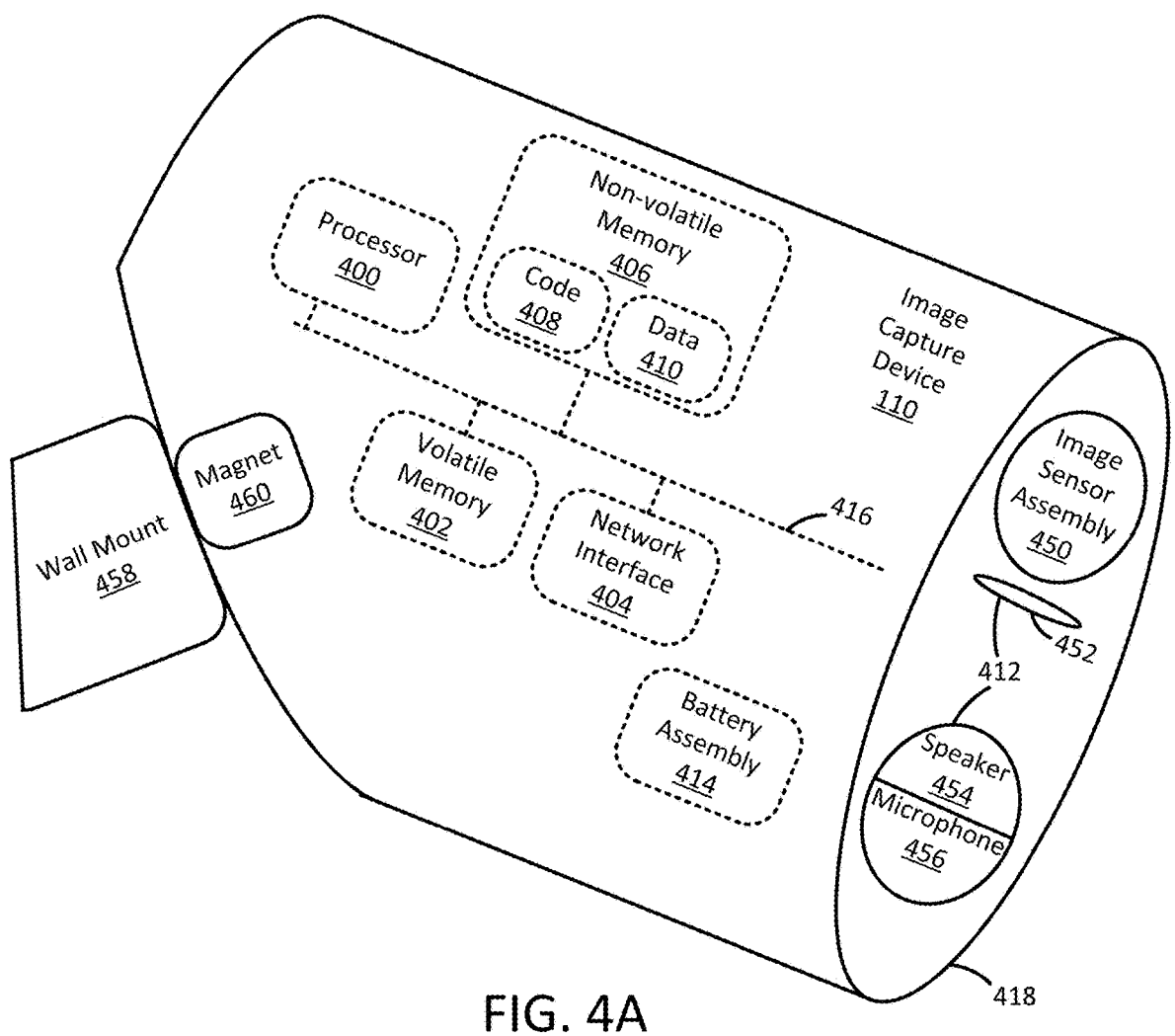
FIG. 4A is a schematic diagram of an image capture device, according to some examples described herein.

Turning now to FIG. 4A, an example of the image capture device 110 is schematically illustrated. As shown in FIG. 4A, in some examples, the image capture device 110 includes at least one processor 400, volatile memory 402, non-volatile memory 406, at least one network interface 404, a battery assembly 414, and an interconnection mechanism 416. These components of the image capture device 110 are illustrated in dashed lines to indicate that they reside within a housing 418. The non-volatile memory 406 stores executable code 408 and a data store 410.

Some examples further include an image sensor assembly 450, which may be an example of the sensor assembly 320. Some examples further include a light source 452, a speaker 454, a microphone 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor). The light source 452 may include a light emitting diode (LED), such as a red-green-blue emitting LED. The light source 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 dB or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 110 in place.

In some examples, the respective descriptions of the processor 300, the volatile memory 302, the network interface 304, the non-volatile memory 306, the code 308, the data 310, the interconnection mechanism 316, and the battery assembly 314 with respect to the sensor 322 are applicable to the processor 400, the volatile memory 402, the network interface 404, the non-volatile memory 406, the code 408, the data 410, the interconnection mechanism 416, and the battery assembly 414, respectively. As such, those descriptions will not be repeated here.

Continuing with the example of FIG. 4A, through execution of the code 408, the processor 400 can control operation of the image sensor assembly 450, the light source 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light source 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alarm via the siren) or streamed from the base station 114 (or one of the processes 130, 128 or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128 or 132 of FIG. 1) via the network interface 404.

In the example of FIG. 4A, the speaker 454, and the microphone 456 implement an instance of the user interface 312 of FIG. 3. Further, the image sensor assembly 450, optionally together with the light source 452, implement an instance of the sensor assembly 320 of FIG. 3. As such, the image capture device 110 illustrated in FIG. 4A is at least one example of the sensor 322 illustrated in FIG. 3. The image capture device 110 may be a battery-powered outdoor sensor configured to be installed and operated in an outdoor environment, such as outside a home, office, store, or other commercial or residential building, for example. The image capture device 110 may instantiate the image capture devices 110a and/or 110b illustrated in FIG. 1. In some examples, the image capture device 110 may be part of a monitoring system or security system. However, in other applications, the image capture device 110 need not serve a security function and/or may be part of a smart home system or device that is not part of a security system. Accordingly, examples and aspects of the image capture device 110 described herein are not limited to security systems and/or security applications.

Figure 4B:
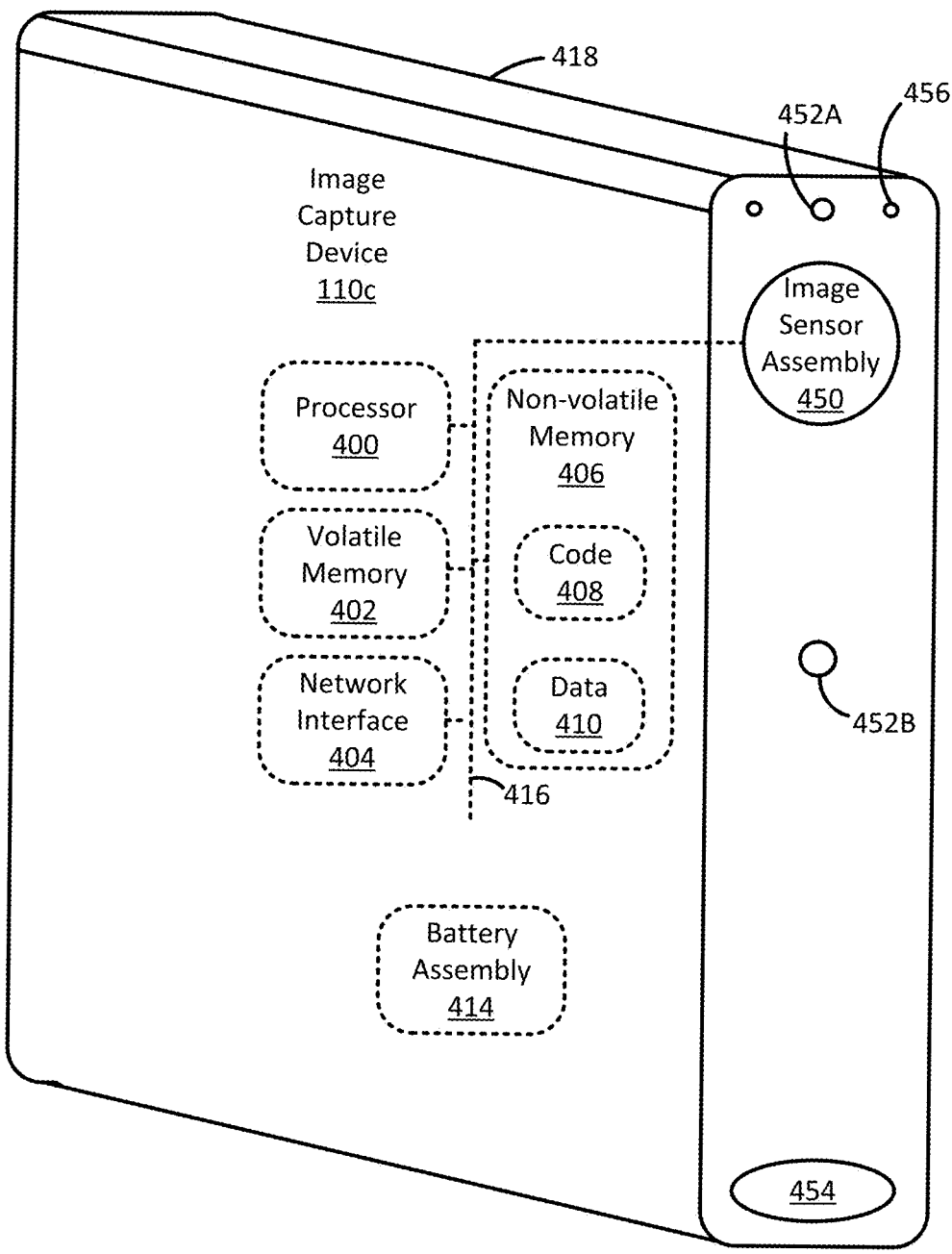
FIG. 4B is a schematic diagram of another image capture device, according to some examples described herein.

Turning now to FIG. 4B, another example of an image capture device 110c is schematically illustrated. The image capture device 110c is a variation of the image capture device 110 and may be used as the image capture devices 110a and/or 110b illustrated in FIG. 1, for example. As shown in FIG. 4B, the image capture device 110c includes the at least one processor 400, volatile memory 402, non-volatile memory 406, the at least one network interface 404, the battery assembly 414, and the interconnection mechanism 416. These components of the image capture device 110c are illustrated in dashed lines to indicate that they reside within a housing 418. As described above, the non-volatile memory 406 stores executable code 408 and a data store 410. The image capture device 110c further includes the image sensor assembly 450, the speaker 454, and the microphone 456 as described above with reference to the image capture device 110 of FIG. 4A. As illustrated in FIG. 4B, the image sensor assembly 450 may be coupled to the processor 400 (e.g., to allow for processing of images acquired by the image sensor assembly) and/or to the network interface 404 (e.g., to allow for transmission of images captured by the image sensor assembly) via the interconnection mechanism 416. Although not illustrated in FIG. 4B, it will be appreciated that the speaker 454 and/or the microphone 456 may also be coupled to the processor 400 via the interconnection mechanism 416, for example.

In some examples, the image capture device 110c further includes light sources 452A and 452B. The light source 452A may include a light emitting diode (LED), such as a red-green-blue emitting LED. The light source 452B may also include an infrared emitting diode to enable night vision in some examples. The light sources 452A and 452B are examples of the light source 452 of FIG. 4A.

In the example of FIG. 4B, the speaker 454, and the microphone 456 implement an instance of the user interface 312 of FIG. 3. In some examples, the image sensor assembly 450, optionally in combination with one or both of the light sources 452A, 452B, implements an instance of the sensor assembly 320 of FIG. 3. As such, the image capture device 110c illustrated in FIG. 4B is at least one example of the sensor 322 illustrated in FIG. 3. The image capture device 110c may be a battery-powered indoor sensor configured to be installed and operated in an indoor environment, such as within a home, office, store, or other commercial or residential building, for example.

Figure 4C:
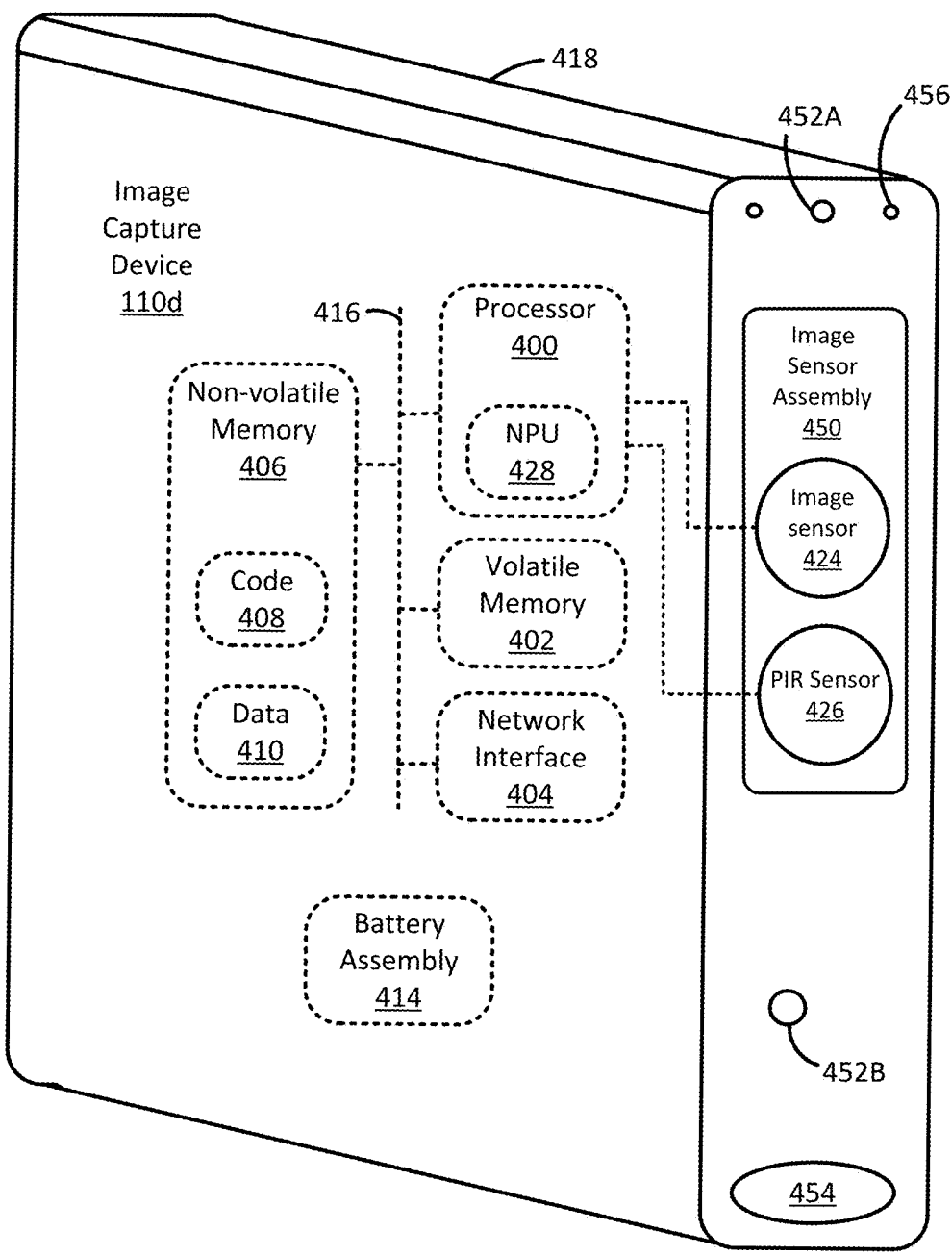
FIG. 4C is a schematic diagram of another image capture device, according to some examples described herein.

FIG. 4C illustrates another example of an image capture device 110d. The image capture device 110d is another variation or example of the image capture device 110 and may be used as the image capture devices 110a and/or 110b illustrated in FIG. 1, for example. In this example, the image sensor assembly 450 includes one or more image sensors 424 (e.g., imaging sensors configured to capture images in one or more spectral bands of the electromagnetic spectrum) and one or more PIR sensors 426, as described above. In some examples, the image sensor 424 collects still image frames and/or video image frames constituting a video feed/stream. The image sensor 424 may operate in the visible spectral band and/or the infrared spectral band, for example. As shown in FIG. 4C, the image sensor 424 and the PIR sensor 426 are coupled to the processor 400, for example, via the interconnection mechanism 416.

In one example, the PIR sensor 426 operates as a motion detector. PIR sensors are motion sensors that detect changes in temperature over a pre-determined field of view. The PIR sensor 424 can be configured with a threshold such that any change larger than the threshold constitutes motion and causes the image capture device 110d to take some further action, such as issuing an alert and/or communicating information to the base station 114. In some examples, the PIR sensor 426 can be tuned to detect people and/or animals based on a known temperature range associated with the body temperatures of people and/or animals.

According to certain examples, the image capture device 110d operates in a low power state (operating mode) in which the image sensor 424 (and optionally other components of the image capture device 110d, such as the light source 452, for example) are deactivated, until motion is detected by the PIR sensor 426. Thus, in some examples, in the low power operating mode, the PIR sensor 426 remains active, but components that generally consume more power, such as the image sensor 424, for example, are powered off. In the low power operating mode, the processor 400 may perform minimal processing, sufficient to monitor for events that trigger the PIR sensor 426. When the PIR sensor 426 indicates motion and issues a signal or notification (e.g., sends a motion trigger signal to the processor 400), the processor 400 is placed into a normal operating mode, in which the image sensor 424 (along with any other components of the image capture device 110d that are powered off in the low power mode) is enabled. Thus, the PIR sensor 424 can act as a mode "switch" that configures the image capture device 110d into the "full power" or normal operating mode only when necessary. In this manner, power can be conserved by operating the image capture device 110d in the low power mode, with various components powered off, until a potential event of interest is detected.

Once active, the image sensor 424 captures one or more frames of image data. In some examples, the image sensor 424 passes the frame(s) of image data ("images" or "image frames") to the processor 400 for processing. In examples, the processor 400 applies a motion detection process to the captured image frames to detect moving objects, which may then be identified as either objects of interest (e.g., people), detection of which may cause the image capture device 110d to issue an alert, or benign objects that can be safely ignored.

Still referring to FIG. 4C, in some examples, the processor 400 includes a neural processing unit (NPU) 428 for efficiently running neural networks to perform aspects of a motion detection process based on the image frames captured by the image sensor 424. In examples, the image capture device 110d is capable of detecting, and distinguishing between, certain objects, such as people or pets, for example, in the image frames captured by the image sensor 424, and can be configured to communicate an object detection event if an object of interest is identified. The image capture device 110d can use any of a variety of techniques to locate and recognize objects in an image frame. For example, computer vision based object detection can use specialized filters for locating different attributes or features within an image frame and then combining the features to classify whether or not a particular category of object is found. For example, an object detector can locate all human faces in a frame. In some examples, the NPU 428 can be configured to implement machine learning based processes or models that are trained on a vast number of images containing objects of interest to recognize similar objects in new or previously unseen images. In addition, examples of the image capture device 110d are configured to detect motion relative to recognized objects. Motion detection is the process of detecting a change in position of an object relative to its surroundings or the change in the surroundings relative to an object. As described above, motion detection based on image processing can be performed by computing the pixel-to-pixel difference in intensity between consecutive frames to create a "difference image" and then applying a threshold to the difference image. In certain examples, any difference values larger than the threshold constitute motion.

In some examples, some or all of the image processing described above may be performed by the processor 400. In some examples, the image capture device 110 can transmit (e.g., via the network interface 404) processed and/or unprocessed images, or summaries thereof, from the image sensor assembly 450 to a remote device for (further) processing and/or analysis.

As discussed above, in certain examples, the image capture device 110 operates in conjunction with the light source 452 that illuminates the scene. In particular, during low light conditions, such as at night, for example, the ability of the image sensor 424 to acquire images of the scene with reasonable clarity may depend on the light source 452 providing sufficient illumination. In low light conditions, the visibility of objects, from dust to intruders, for example, may depend on the relative positions of the image sensor 424, the object, and the light source 452, and also on the field of view (FOV) of the image sensor 424. An example is illustrated in FIG. 5.

Figure 5:
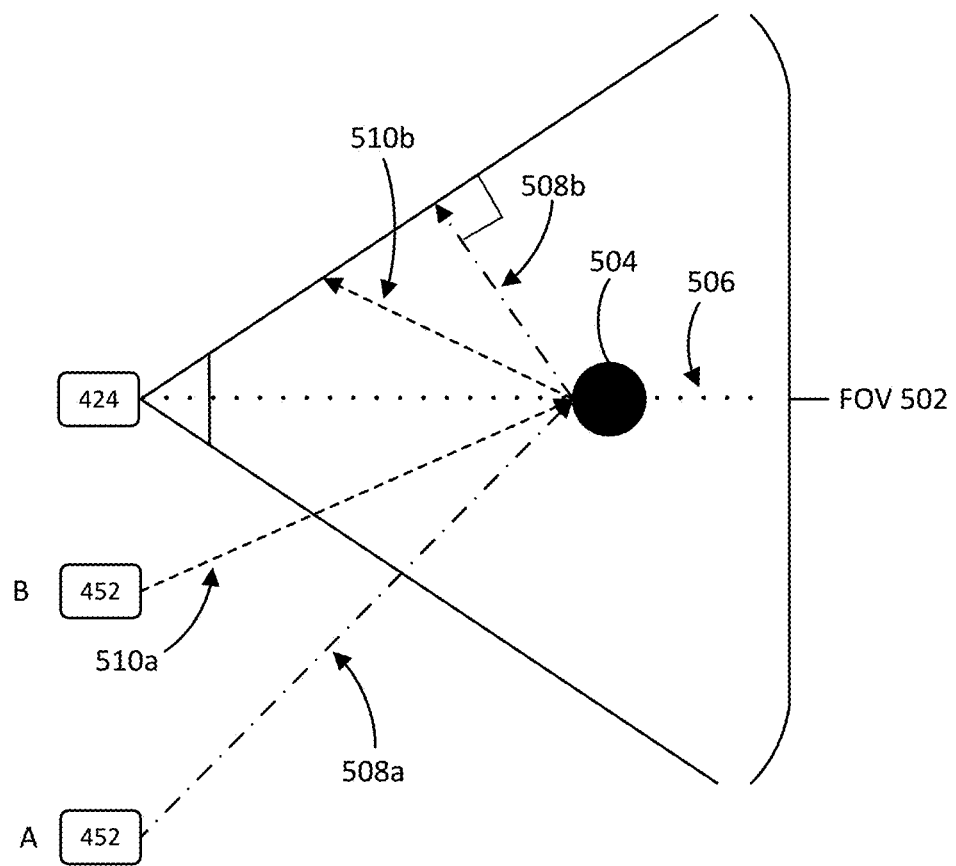
FIG. 5 is a diagram illustrating a light source at different positions relative to an image sensor, according to some examples described herein.

Referring to FIG. 5, there is illustrated an example of the image sensor 424 having a field of view 702. It will be appreciated that FIG. 5 is a two-dimensional illustration (e.g., a side view or a plan view), and therefore depicts the field of view 502 along one axis, showing for example either the horizontal angular extent (or width) of the FOV or the vertical angular extent (or height) of the FOV. The angular extent of the field of view 502 in the horizontal and vertical dimensions may be the same or different, as described further below, and the following discussion applies equally in either dimension. An object 504 is depicted, positioned along the boresight 506 (e.g., the central axis of the FOV 502) of the image sensor 454. In the illustrated example, the image sensor 424 and the light source 452 are positioned in the same plane, where the boresight 506 of the image sensor 424 is the normal vector. For the following discussion, it is assumed that the object 504 has a smooth reflective surface that is orthogonal to the boresight 506 of the image sensor 424.

Continuing with the example of FIG. 5, and assuming that the light source 452 is the sole, or at least dominant, source of illumination of the scene for the image sensor 242, the object 504 is visible to the image sensor 424 (e.g., may appear in images acquired by the image sensor 424) when light from the light source 452 reflected off the object 504 has a vector component parallel to the image sensor FOV 502. This can occur when the light source 452 is relatively close to the image sensor 424 or the object 504 is relatively distant from the image sensor 424, as described further below. In contrast, the object 504 is not visible when the reflected light does not have a vector component facing towards the image sensor 424 (e.g., when the light source 452 is farther away from the image sensor 424 or the object 504 is closer to the image sensor 424). For example, when light that is reflected from the object 504 (e.g., reflected light 508*b*) is at least orthogonal to the image sensor FOV 502 (and as a result, has no vector component directed along the FOV 502 toward the image sensor 424), the object 504 will not be visible to the image sensor 424.

Thus, for example, when the light source 452 is placed at position A, light 508*a* from the light source 452 is incident on the object 504 at an angle such that reflected light 508*b* is orthogonal to the image sensor FOV 502, as shown in FIG. 5. If the reflected light is at least orthogonal to the image sensor FOV 502, there is no vector component of the reflected light that is directed into the FOV 502 and toward the image sensor 424. Rather, the reflected light 508*b* is directed away from the image sensor 424. Accordingly, since in this condition no reflected light from the object 504 reaches the image sensor 424, the object 504 is not visible to the image sensor 424. Accordingly, for the light source 452 being in position A, or moved further away from the image sensor 424 than position A, the object 504 will not be visible to the image sensor 424. Similarly, for the light source 452 being in position A, if the object 504 is moved closer to the image sensor 424, the angle of incidence of the light 508*a* increases, and the object 504 is not visible to the image sensor 424. In contrast if the light source 452 is moved closer to the image sensor 424, for example, to position B, the angle of incidence of light 510*a* from the light source 452 on the object 504 is reduced, such that the reflected light 510*b* has a vector component that is within the image sensor FOV 502 and the object 504 is visible to the image sensor 424. Similarly, moving the object 504 further away from the image sensor 424 reduces the angle of incidence of incident light (assuming a constant position of the light source 452) such that the object 504 is visible to the image sensor 424. In general, the closer the light source 452 is to the image sensor 424, the smaller the angle of incidence, and the more visible and evenly illuminated the object 504 becomes.

Figure 6:
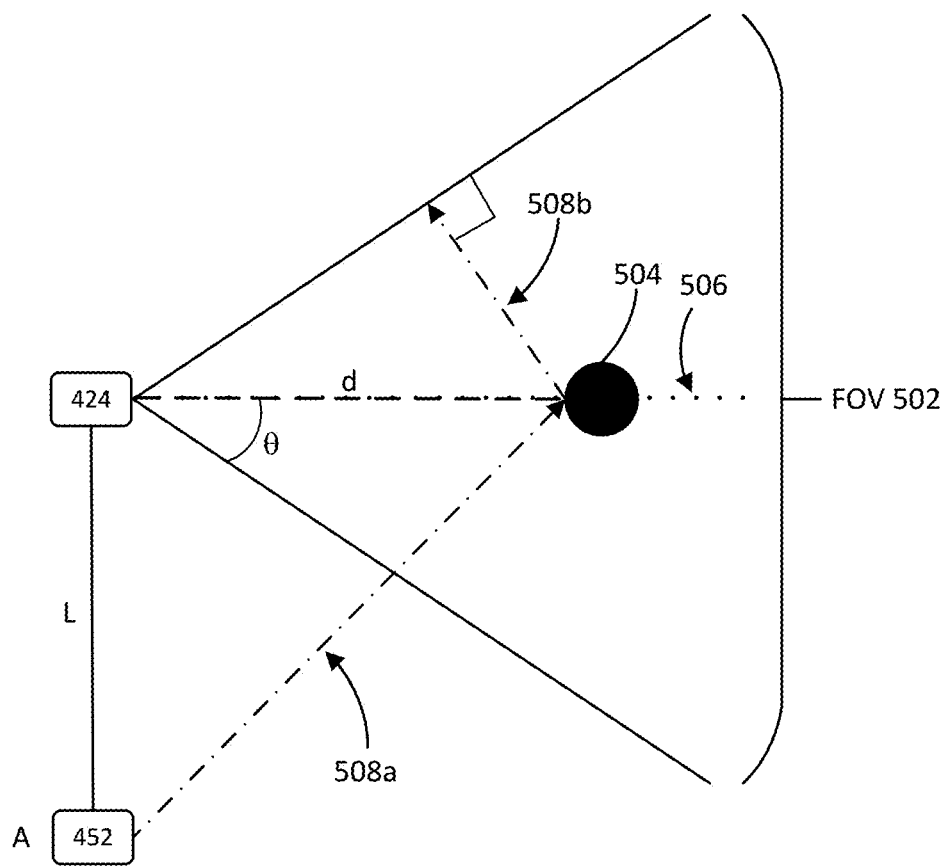
FIG. 6 is a diagram illustrating placement of a light source relative to an image sensor in accord with some examples described herein.

Referring now to FIG. 6, using trigonometry, a threshold can be derived for the distance between the image sensor 424 and the light source 452 beyond which the object 504 is not visible to the image sensor 424. In FIG. 6, and in the following functions, $\theta$ is the half-angle of the image sensor FOV 502, d is the distance between the image sensor 424 and the object 504, and L is the distance between the image sensor 424 and the light source 452. These variables are related according to Function (F1):

$$d/L = \tan \theta \quad \text{(F1)}$$

For an image sensor 424 having a given field of view (e.g., $\theta$ is known and fixed), the threshold distance L can be determined using Function (F1) depending on the distance, d, of potential objects 504 in the field of view of the image sensor 424. In particular, the threshold value of L (e.g., the minimum distance between the image sensor 424 and the light source 452 for an object at distance d from the image sensor 424 not to be visible) can be determined according to Function (F1) based a known value of $\theta$ and a threshold value of d (e.g., a minimum distance between the object 504 and the image sensor 424 for the object 504 to be visible). Once a value of L is selected, thus fixing the distance between the image sensor 424 and the light source 452, objects 504 that are closer than the distance d to the image sensor 424 will not be visible because the reflected light 508*b* will not have a vector component directed toward the image sensor 424.

Small particles, such as dust, for example, are typically only large enough to be visible to certain image sensors when they are relatively close to the image sensor, such as within a few inches (e.g., less than 2 or 3 inches from the image sensor 424). In contrast, objects of interest, such as people or vehicles, for example, may be much larger and therefore visible to the image sensor 424 even when they are much farther away. In addition, in many applications, including security or other monitoring applications, for example, the image capture device 110 may typically be positioned (e.g., above a doorway, on a wall, etc.) such that objects of interest (e.g., people and/or vehicles) are generally several feet away (e.g., at least 5 feet away from the image sensor 424) when they enter the field of view of the image sensor 424. Accordingly, in at least some applications, there may be a large difference between the distance, d, at which potential objects of interest can be detected and the distance, d, at which it would be preferable to avoid detection of nuisance objects, such as dust, rain, or snow, for example. Accordingly, selecting the threshold distance, L, for placement of the light source 452 relative to the image sensor 424 may be accomplished based on a threshold distance for small nuisance objects without negatively impacting the ability of the image capture device 110 to detect potential objects of interest. The threshold distance, d, can be selected based on, for example, an estimated size of objects to be excluded, and may be in a range of a few inches (e.g., 1.5 to 4 inches) from the image sensor 424.

For example, if d is selected to be 2 inches, for an image sensor 424 having a field of view half-angle of $\theta=29°$, based on Function (F1), the light source 452 should be placed at least a distance L=3.61 inches away from the image sensor 424. With this spacing between the image sensor 424 and the light source 452, objects 504 closer than 2 inches to the image sensor 424 will not be visible. Accordingly, for this field of view, positioning the light source 452 to be at least 3.61 inches away from the image sensor 424 may be beneficial in terms of reduce visibility of dust or other small nuisance objects while maintaining visibility of people and/or other objects of interest. As described above, people and/or other objects of interest are typically at least 5 feet away from the image sensor 424, and may be detected significantly further away as well (e.g., up to 100 feet in some examples). Based on Function (F2), for an image sensor 424 having $\theta=29°$, an object 504 at a distance 5 feet from the image sensor 424 may not be visible to the image sensor 424 if the light source 452 is positioned a distance L=9.02 feet from the image sensor 424. Accordingly, there may be a large range in possible values of L that achieve the benefit of reducing the visibility of small, close, nuisance objects without impacting the ability of the image sensor 424 to detect objects of interest. For example, for objects at a distance, d, of at least 5 feet from the image sensor 424, the angle of incidence for light of the light source 452 positioned several inches (e.g., L in a range of about 3 to 10 inches) from the image sensor 424 is still very small, and thus placement of the light source 452 within such a range of L may have little to no impact on the visibility of people, vehicles, or other such potential objects of interest.

In some examples, for an image sensor 424 having a field of view in a range of about 50° to 66° ($\theta=25°$ to $\theta=33°$), L may be in a range of about 3 inches to 10 feet; for example, 3 inches to 7.5 feet, or 3.5 inches to 8.5 feet, or 3.6 inches to 9 feet, or 4 inches to 10 feet, or 4.5 inches to 10 feet, or 4 inches to 7 feet, or, 4 inches to 3 feet, or 3 inches to 3 feet, or any of numerous other ranges as may be calculated based on Function (F1) and the considerations described above.

Figure 7:
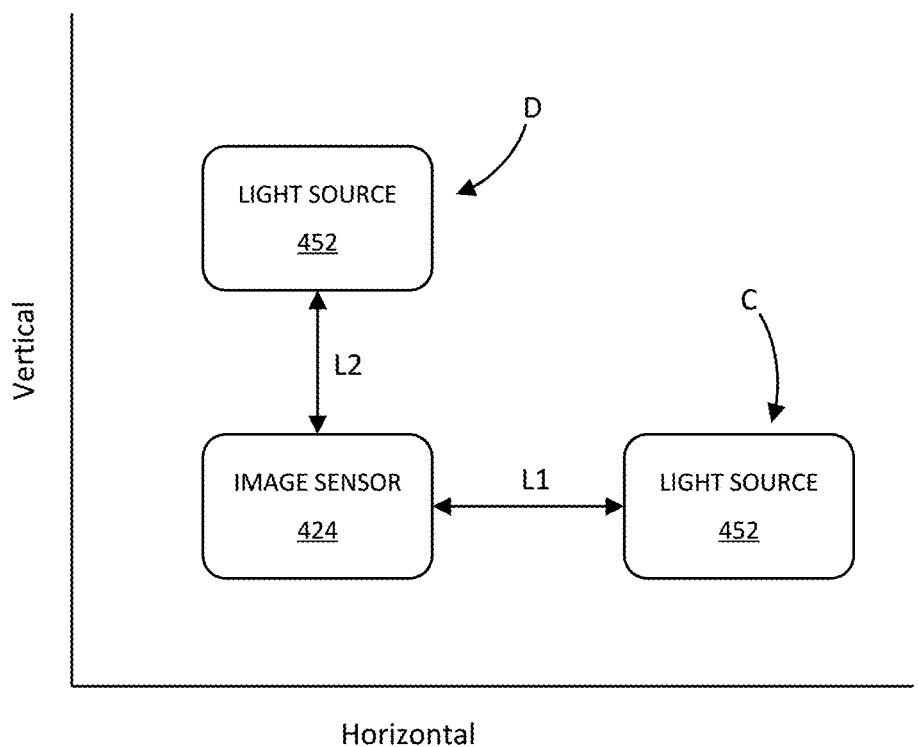
FIG. 7 is a diagram illustrating a light source at different positions relative to an image sensor, according to some examples described herein.

According to certain examples, the light source 452 may be placed in various different locations relative to the image sensor 424. For example, the light source 452 may be placed above or below the image sensor 424 (e.g., in the vertical plane of the image sensor 424), or to the left or right side of the image sensor 424 (e.g., in a horizontal plane of the image sensor 424), or some combination thereof. An example is illustrated in FIG. 7. As described above, the image sensor 424 may have the same or different half-angles for the field of view in the horizontal and vertical dimensions. Accordingly, the distance L by which the light source 452 is spaced apart from the image sensor 424 in accord with the principles described above may vary depending on whether the light source 452 is placed to the side of the image sensor 424 or above or below the image sensor 424. For example, referring to FIG. 7, if the light source 452 is placed to the left or right of the image sensor 424 in the horizontal plane of the image sensor (e.g., at position C), a threshold distance L1 may be determined according to Function (F1) based on the horizontal field of view of the image sensor 424 and the desired cut-off distance, d, for visible objects. Similarly, if the light source 452 is placed above or below the image sensor 424 in the vertical plane of the image sensor (e.g., at position D), a threshold distance L2 may be determined according to Function (F1) based on the vertical field of view of the image sensor 424 and the desired cut-off distance, d, for visible objects. It will be appreciated that the light source 452 may be positioned in any of numerous other planes between the vertical and horizontal plane, and in such instances, a combination of the distances L1 and L2 can be used to position the light source 452 relative to the image sensor 424.

The positioning of the light source 452 relative to the image sensor 424 may depend on various factors, including, for example, a configuration of the image capture device 110 (e.g., the shape of the housing 418 and/or the placement of the image sensor assembly 450 within the housing 418) and/or whether the light source 452 is integrated with the image capture device 110 (e.g., also placed at least partially within the housing 418), attached to the image capture device 110 (e.g., attached to an exterior of the housing 418), or spaced apart from the image capture device 110. In some examples, based on potential mounting locations of the light source 452, the threshold distances L1 and/or L2 can be determined according to Function (F1) as described above, and an appropriate mounting location for the light source can be selected. In other examples, based on the threshold distances L1 and/or L2, a placement of the light source 452 can be selected that is compatible with the distances L1 and/or L2. For example, if L1 and/or L2 are relatively small (e.g., 3 or 4 inches), it may be possible to mount the light source 452 within the housing 418 of the image capture device 110 or attached to the housing 418 of the image capture device 110. Alternatively, if L1 and/or L2 is larger (e.g., 10-18 inches or more), the light source may be spaced apart from the image capture device 110.

Figure 8:
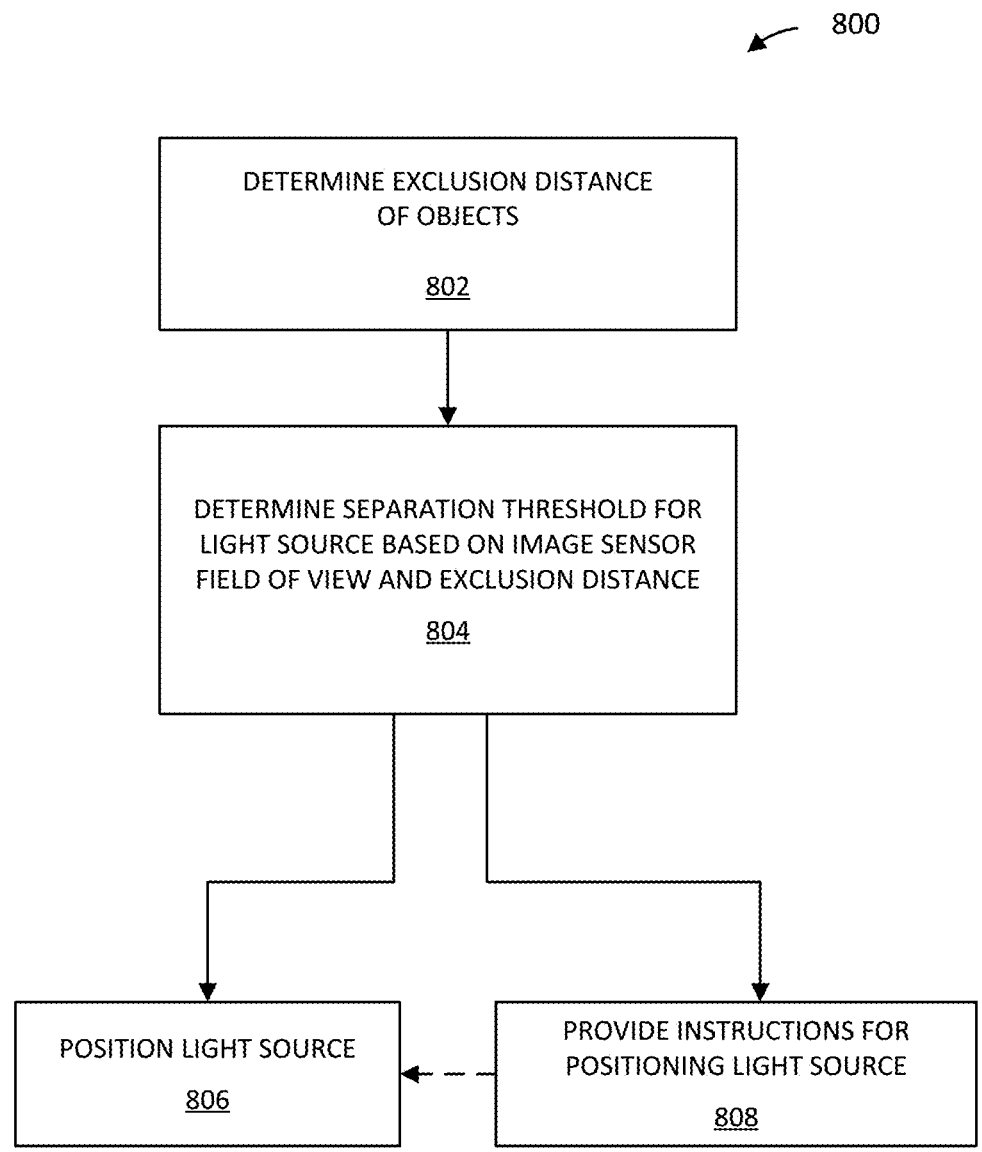
FIG. 8 is a flow diagram illustrating an example of a positioning process that can be performed in accord with some examples described herein.

Referring now to FIG. 8, there is illustrated a flow diagram of a method 800 of positioning the light source 452 relative to the image sensor 424 of an image capture device 110, according to an example. At operation 802, the distance, d, at which it is desired to exclude objects from being visible to the image sensor 424 is determined. As described above, provided the distance L is appropriately chosen based on Function (F1), objects that are closer to the image sensor 424 than the selected distance, d, will not be visible. As also described above, certain small objects, such as dust, for example, generally may be visible to the image sensor 424 only if they are very close, for example, within about 2 inches of the image sensor 424. Similarly, other small nuisance objects such as rain, snow, or very small insects, for example, may also only be visible when they are close to the image sensor 424 (e.g., within a few inches). Accordingly, at operation 802, the "exclusion" distance, d, may be selected based on the size and/or other characteristics of the objects one does not want the image sensor 424 to detect.

At operation 804, based on the selected value of d, and based on a known field of view (e.g., half angle $\theta$) of the image sensor 424, the threshold distance(s) L1 and/or L2 can be calculated according to Function (F1), as described above.

In some examples, operations 802 and 804 may be performed by a designer, manufacturer, or installer of the image capture device 110. In some instances (e.g., in the case of operations 802 and 804 being performed by an installer), the method 800 may include operation 806 of positioning the light source 452 relative to the image sensor 424 based on the threshold distance(s) L1 and/or L2 calculated at operation 804. As described above, positioning the light source 452 may include mounting the light source 452 within or attached to the housing 418 of the image capture device 110. In other examples, positioning the light source 452 may include mounting the light source 452 at least the minimum distance, L, away from the image capture device 110, once the image capture device 110 itself has been mounted/installed in a selected location.

In some examples (e.g., where operations 802 and 804 are performed by a designer or manufacturer), the person(s) installing the light source 452 may not be the same person(s) who performed operations 802 and 804. Accordingly, in such examples, the method 800 may include operation 808 of providing instructions for mounting/installing the light source 452 relative to the image capture device 110. For example, the instructions may include written instructions and/or a diagram identifying the minimum distance (e.g., L1 and/or L2) that the light source 452 should be positioned away from the image capture device 110 and/or the orientation of the light source 452 relative to the image capture device 110. For example, the instructions may specify that the light source should be positioned a minimum distance L1 to one side of the image capture device and/or a minimum distance L2 above or below the image capture device 110. In some examples, the instructions may also specify a maximum distance (in the horizontal and/or vertical dimensions) that the light source 452 should be positioned relative to the image capture device 110 (e.g., to avoid inadvertently excluding potential objects of interest, such as people, for example). Thus, in some examples, operation 804 may further include determining maximum separation distance(s) between the light source 452 and the image sensor 424, as well as the minimum separation distances L1 and/or L2. In some examples, the instructions may specify where and/or how to mount the light source to the exterior of the housing 418 of the image capture device. As will be appreciated, many variations are possible and are intended to be within the scope of this disclosure.

In some instances, a person may install the light source 452 according to the instructions provided at operation 808. Thus, the method 800 may include operation 806, which may be performed by the same or different person(s) as they who performed operations 802, 804 and/or 808. It will further be appreciated that, in some examples, operation 804 may be performed by a computing device, either independently (e.g., based on a provided value of d and program code specifying a version of Function (F1) and/or other parameters for calculating L) or under the operation of a person.

Figure 9A:
FIGS. 9A and 9B are consecutive image frames taken in a dark setting using an image capture device with a light source positioned proximate an image sensor of the image capture device.
Figure 9B:
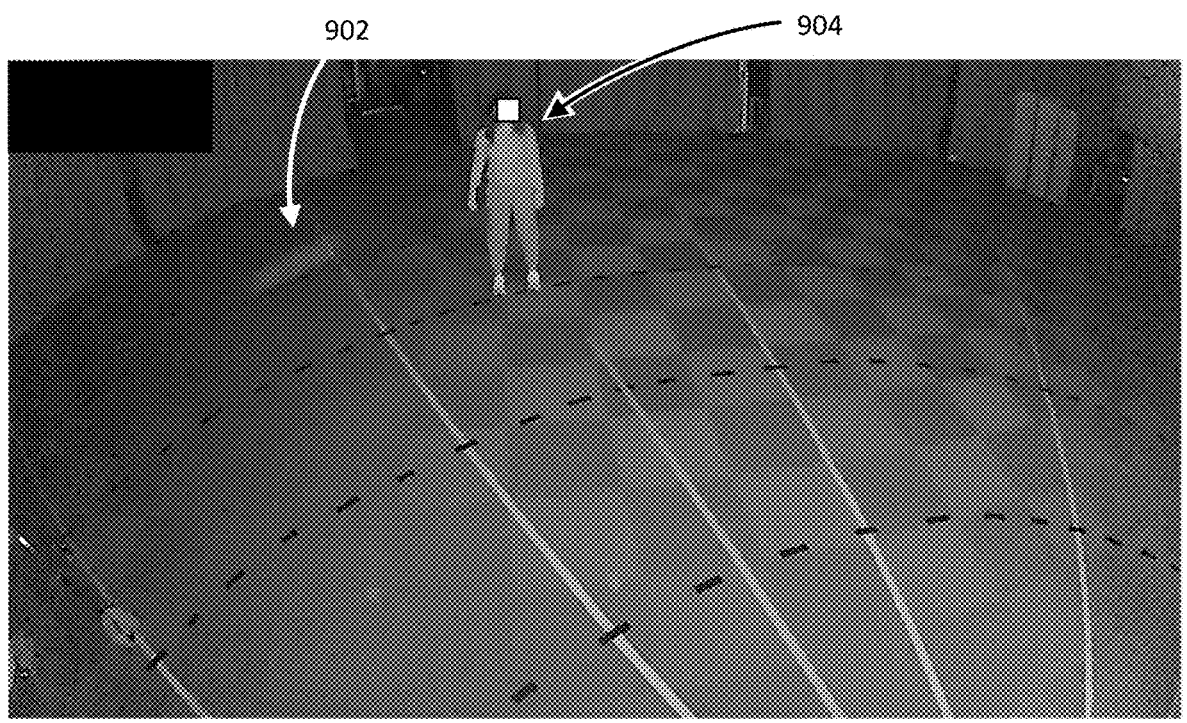
Figure 9C:
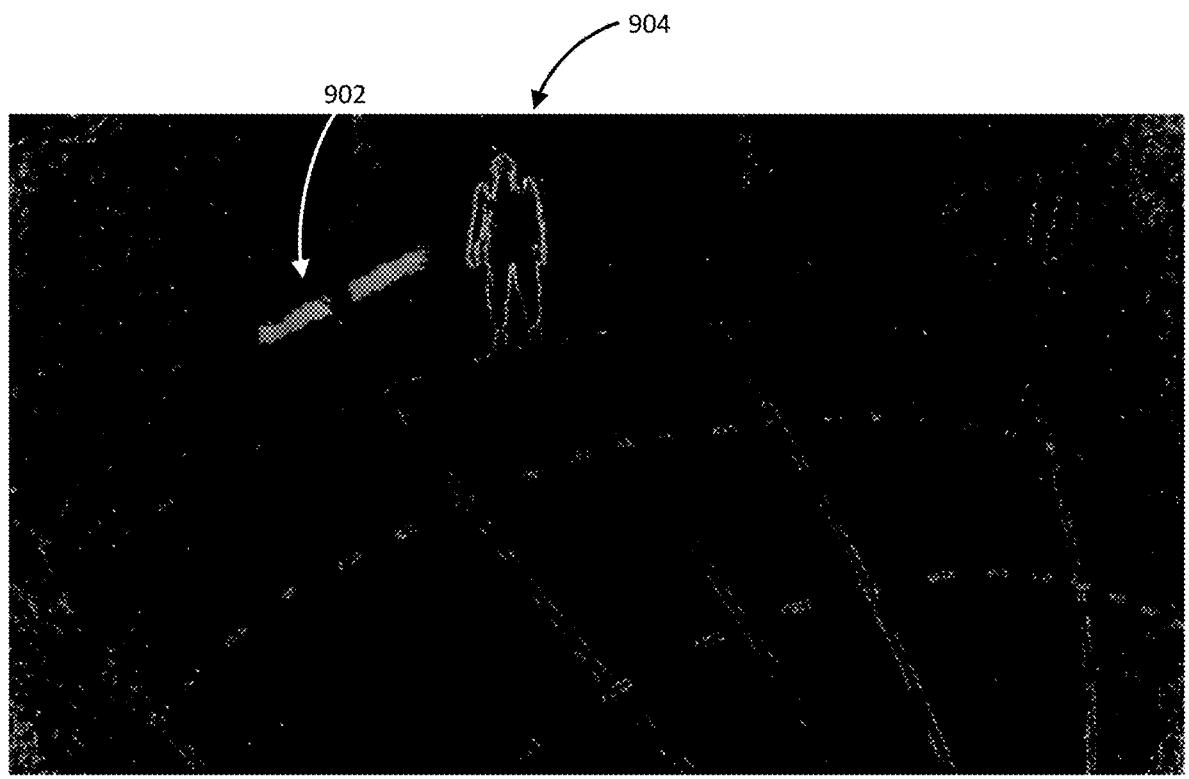
FIG. 9C is a difference image produced based on the images depicted in FIGS. 9A and 9B.

Thus, aspects and examples provide techniques and a methodology for reducing the sensitivity of a monitoring sensor and/or system to small objects that can otherwise be a nuisance and/or degrade system performance. For example, as described above, by employing the techniques disclosed herein, small, nearby objects, such as dust particles, rain drops, small insects, and the like, can be excluded from images acquired by the image capture device 110, thereby enhancing the quality of the images (e.g., by removing objects that may otherwise appear as blur or "graininess" in the image and/or add distractions that degrade the clarity of the image). Furthermore, by excluding these small nuisance objects, false positive motion detections (e.g., detection of movement of these small objects rather than of a potential object of interest) can be reduced, which in turn may save resources and/or improve the reliability of the system. For example, as described above, when motion is detected, the image capture device 110 and/or other system components can be configured to take additional actions, such as recording video sequences, transmitting images and/or a video stream to other devices, and/or triggering an alarm (in security applications, for example). Such actions can use up battery life of battery-powered devices and/or require human intervention (e.g., to review and/or clear the alarm). Thus, by reducing false positive detections, resources such as battery life and operator time can be used more effectively. Experiments using both a visible light source (e.g., a white LED) and an infrared light source (e.g., an infrared LED) have demonstrated that by positioning the light source 452 at least the minimum distance (L) away from the image sensor 424 of the image capture device 110, as determined according to Function (F1) described above, image distortion associated with imaging small objects in the field of view of the image sensor 424 can be reduced. For example, FIGS. 9A and 9B illustrate consecutive images frames taken in a dark setting using an image sensor 424 having a field of view of 58° and with the light source 452 positioned approximately 1 inch away. As described above, in this arrangement, the angle of incidence of light from the light source 452 on nearby objects is very low. As a result, dust 902 to the left of a person 904 is clearly visible. In FIGS. 9A and 9B, the face of the person 904 has been obscured for privacy. FIG. 9C is a difference image representing the difference in pixel intensities between the two consecutive image frames of FIGS. 9A and 9B. As described above, such difference images can be used to make a determination about content of an image (e.g., for motion detection, to determine which regions of the image are representative of a moving object). In the difference image of FIG. 9C, white pixels represent changes in the second image frame of FIG. 9B relative to the first image frame of FIG. 9A. It can be seen that the person 904 and the dust 902 are both clearly visible in the difference image of FIG. 9C. Accordingly, in examples in which the difference image may be used for motion detection, motion may be detected based on the dust 902 which can result in false positive motion detection events and false alarms for a user.

Figure 10A:
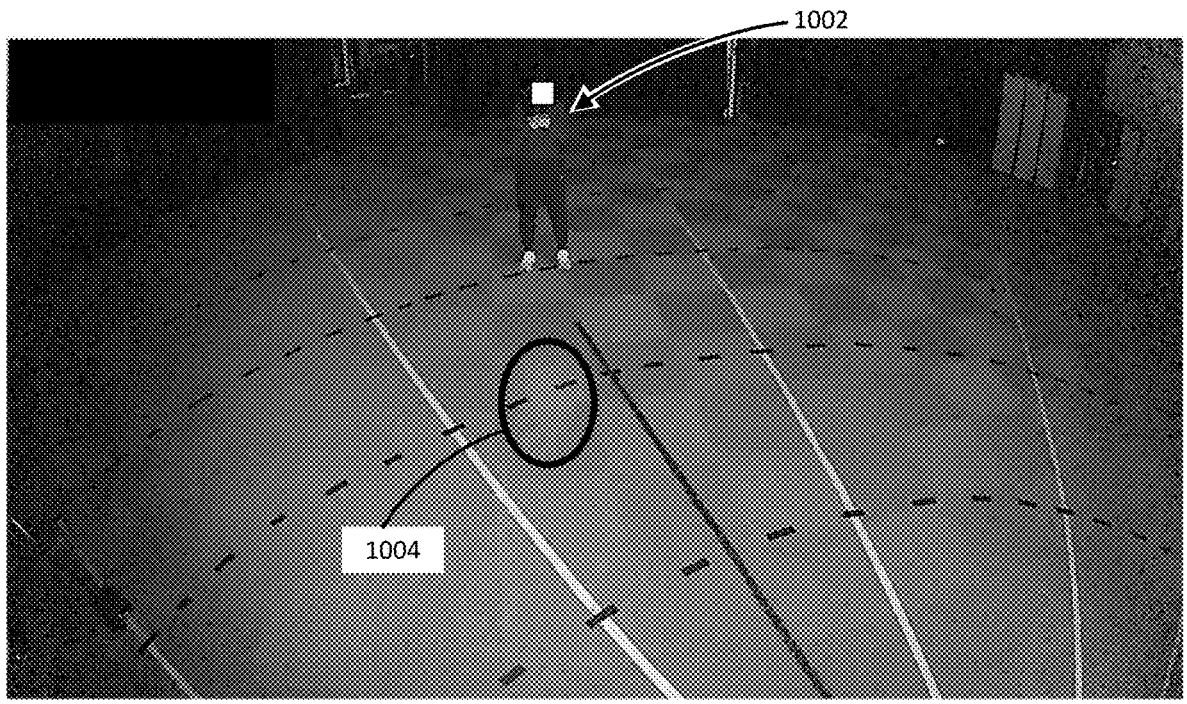
FIG. 10A is an image from an image sensor with a light source positioned a first distance from the image sensor.
Figure 10B:
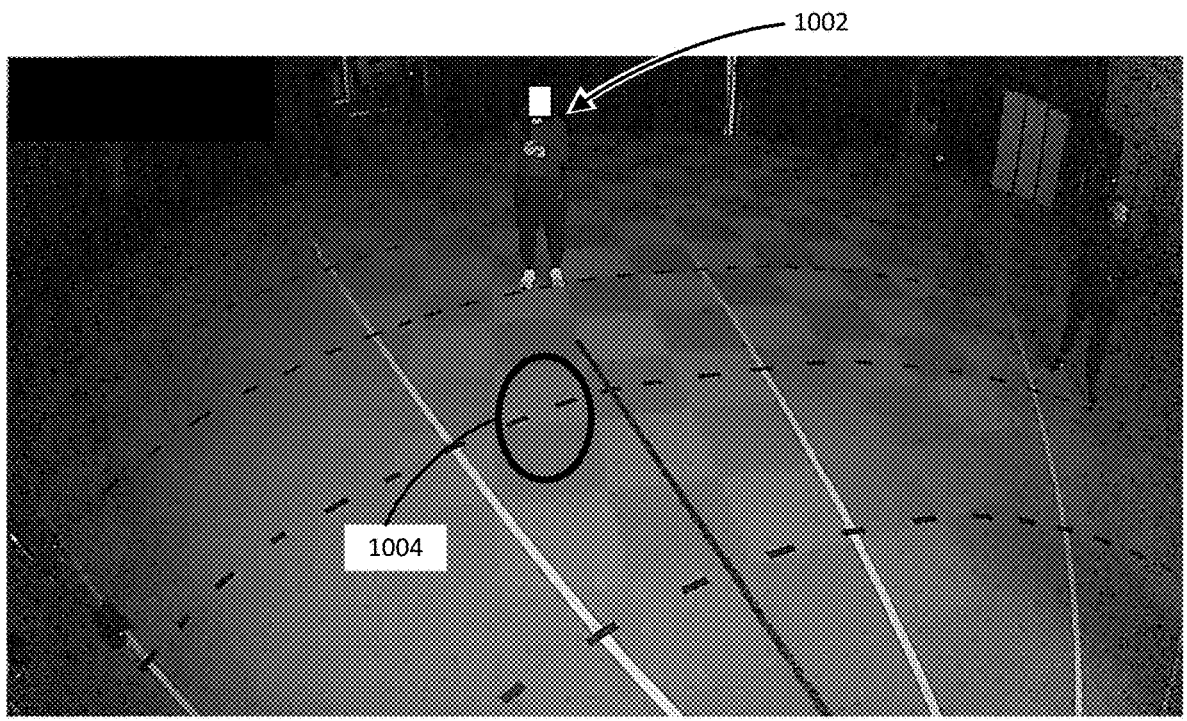
FIG. 10B is an image from the image sensor with the light source positioned a second distance from the image sensor, in accord with some examples described herein.

In contrast, when the light source 452 is moved to approximately 4 inches from the image sensor 424, small dust particles are significantly less visible. However, larger objects, such as people, at least 5 feet away from the image capture device 110 still remain visible and well-exposed. For example, referring to FIG. 10A, there is illustrated an image taken using an example of the image sensor 424 with the light source 452 (implemented as an LED) positioned approximately 1 inch away from the image sensor. As shown, a person 1002, positioned approximately 15 feet away from the image sensor 424 in this example, is visible in the image frame. In addition, dust (circled by circle 1004) is also visible in the image frame of FIG. 10A. FIG. 10B illustrates an image of the same scene as in the image frame represented in FIG. 10A, but with the light source 452 positioned approximately 4 inches away from the image sensor 424. In this example, the person 1002 is still clearly visible, however, dust in the circled region 1004 is not visible. This example illustrates that by moving the light source 452 further away from the image sensor 424, the visibility of small particles (e.g., dust) can be reduced without reducing visibility of objects of interest, such as the person 1002. In FIGS. 10A and 10B, the face of the person 1002 has been obscured for privacy.

Thus, aspects and examples provide systems and methods that can improve the reliability of, and user experiences with, monitoring camera systems. As discussed above, examples provide an approach by which to constrain the position of the light source 452 with respect to the image sensor 424 based on the visibility of small particles. In particular, techniques provide for strategically positioning the light source 452 relative to the image sensor 424 to increase the angle of incidence of light, as described above, so as to reduce visibility of small particles without reducing visibility of objects of interest. Examples of the approach disclosed herein can be used to improve the accuracy of motion detection, object detection, and/or other video analytics performed by the image sensor 110, without altering software responsible for these functions. Thus, according to certain examples, the accuracy of software-based motion and/or object detection processes can be improved through a hardware configuration of the system, particularly, constrained (optionally optimized) positioning of the light source 452 relative to the image sensor 424. Optimizing the position of the light source 452 using the techniques described herein further can improve user satisfaction by reducing false positive events, providing better image quality, and improving battery life. Furthermore, potential monitoring costs associated with engaging monitoring personnel via the monitor interfaces 130, as described above, can be reduced by reducing false positive events.

Figure 11:
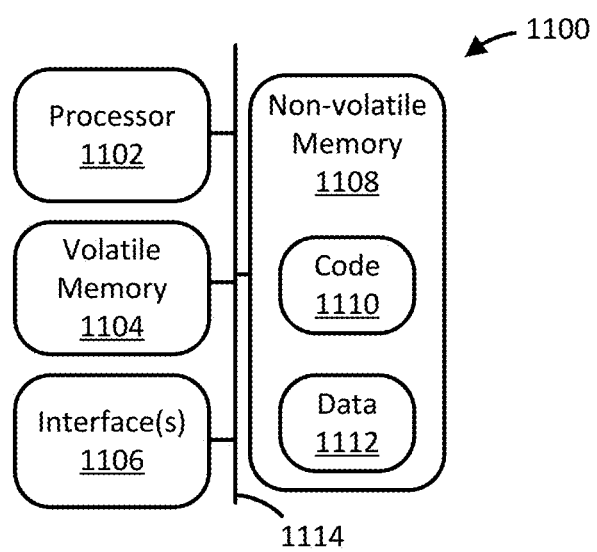
FIG. 11 is a schematic diagram of a computing device, according to some examples described herein.

Turning now to FIG. 11, a computing device 1100 is illustrated schematically. As shown in FIG. 11, the computing device includes at least one processor 1102, volatile memory 1104, one or more interfaces 1106, non-volatile memory 1108, and an interconnection mechanism 1114. The non-volatile memory 1108 includes code 1110 and at least one data store 1112.

In some examples, the non-volatile (non-transitory) memory 1108 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1110 stored in the non-volatile memory can include an operating system and one or more applications or programs that are configured to execute under the operating system. Alternatively or additionally, the code 1110 can include specialized firmware and embedded software that is executable without dependence upon a commercially available operating system. Regardless, execution of the code 1110 can result in manipulated data that may be stored in the data store 1112 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 11, the processor 1102 can be one or more programmable processors to execute one or more executable instructions, such as a computer program specified by the code 1110, to control the operations of the computing device 1100. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1104) and executed by the circuitry. In some examples, the processor 1102 is a digital processor, but the processor 1102 can be analog, digital, or mixed. As such, the processor 1102 can execute the function, operation, or sequence of operations using digital values and/or using analog signals. In some examples, the processor 1102 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1102 that are multicore can provide functionality for parallel, simultaneous execution of instructions or for parallel, simultaneous execution of one instruction on more than one piece of data.

Continuing with the example of FIG. 11, prior to execution of the code 1110 the processor 1102 can copy the code 1110 from the non-volatile memory 1108 to the volatile memory 1104. In some examples, the volatile memory 1104 includes one or more static or dynamic random access memory (RAM) chips and/or cache memory (e.g. memory disposed on a silicon die of the processor 1102). Volatile memory 1104 can offer a faster response time than a main memory, such as the non-volatile memory 1108.

Through execution of the code 1110, the processor 1102 can control operation of the interfaces 1106. The interfaces 1106 can include network interfaces, such as the network interface 204, 304, 404, for example. These network interfaces can include one or more physical interfaces (e.g., a radio, an ethernet port, a USB port, etc.) and a software stack including drivers and/or other code 1110 that is configured to communicate with the one or more physical interfaces to support one or more LAN, PAN, and/or WAN standard communication protocols. The communication protocols can include, for example, TCP and UDP among others. As such, the network interfaces enable the computing device 1100 to access and communicate with other computing devices via a computer network.

The interfaces 1106 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1110 that is configured to communicate with the user input and/or output devices. As such, the user interfaces enable the computing device 1100 to interact with users to receive input and/or render output. This rendered output can include, for instance, one or more GUIs including one or more controls configured to display output and/or receive input. The input can specify values to be stored in the data store 1112. The output can indicate values stored in the data store 1112.

Continuing with the example of FIG. 11, the various aspects of the computing device 1100 described above can communicate with one another via the interconnection mechanism 1114. In some examples, the interconnection mechanism 1114 includes a communications bus.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and aspects discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

Descriptions of additional examples follow. Other variations will be apparent in light of this disclosure.

Example 1 provides a method comprising determining, based on a minimum distance from an image sensor at which objects within a field of view of the image sensor are to be visible to the image sensor, a minimum relative spacing in at least one dimension between the image sensor and a light source configured to illuminate at least a portion of the field of view of the image sensor.

Example 2 provides a method comprising illuminating a scene using a light source that is positioned relative to an image sensor such that an angle of incidence of light at first objects within a field of view of the image sensor is greater than or equal to a threshold angle of incidence, wherein the first objects are positioned less than a selected distance from the image sensor, wherein the light is emitted by the light source, and wherein the threshold angle of incidence is the angle of incidence at which reflections of the light from the first objects are orthogonal to the field of view of the image sensor. The method further comprises acquiring a plurality of images of the scene using the image sensor, and processing at least two images of the two or more images to detect motion of a second object within the field of view of the image sensor, the second object being further from the image sensor than the selected distance.

Example 3 includes the method of Example 2, wherein processing the at least two images to detect the motion of the second object includes detecting the motion of the second object without detecting motion of the first objects.

Example 4 includes the method of one of Examples 2 or 3, wherein the selected distance is in a range of 1.5 inches to 4 inches.

Example 5 includes the method of Example 4, wherein the selected distance is 2 inches.

Example 6 includes the method of any one of Examples 2-4, further comprising selecting the selected distance based on an estimated size of the first objects.

Example 7 provides a camera system comprising an image sensor having a field of view with a horizontal half angle and a vertical half angle, and a light source configured to emit light to illuminate at least a portion of the field of view of the image sensor, the light source being positioned relative to the image sensor such that an angle of incidence of the light at first objects that are within the field of view of the image sensor and positioned less than a selected distance from the image sensor is greater than or equal to a threshold angle of incidence at which reflections of the light from the first objects are orthogonal to the field of view of the image sensor.

Example 8 includes the camera system of Example 7, further comprising a housing, the image sensor being disposed at least partially within the housing.

Example 9 includes the camera system of Example 8, wherein the light source is attached to the housing.

Example 10 includes the camera system of Example 8, wherein the light source is disposed at least partially within the housing.

Example 11 includes the camera system of any one of Examples 7-10, wherein the light source is positioned at least a minimum horizontal distance from the image sensor, wherein the minimum horizontal distance is determined based on the horizontal half angle of the field of view of the image sensor and the selected distance.

Example 12 includes the camera system of any one of Examples 7-11, wherein the light source is positioned at least a minimum vertical distance from the image sensor, wherein the minimum vertical distance is determined based on the vertical half angle of the field of view of the image sensor and the selected distance.

Example 13 includes the camera system of any one of Examples 7-12, wherein the light source is positioned in a range of 3 inches to 5 feet away from the image sensor.

Example 14 includes the camera system of Example 13, wherein the light source is positioned in a range of 3.5 inches to 4.5 inches away from the image sensor.

Example 15 includes the camera system of one of Examples 13 or 14, wherein the selected distance is 2 inches.

Example 16 includes the camera system of any one of Examples 7-15, further comprising a motion detector, wherein the light source and the image sensor are configured to transition from an inactive state to an active state based on detection of motion by the motion detector.

Example 17 includes the camera system of Example 16, wherein the motion detector is a passive infrared sensor.

Example 18 includes the camera system of one of Examples 16 or 17, further comprising a battery configured to supply operating power for the motion detector, the light source, and the image sensor.

Example 19 includes the camera system of any one of Examples 7-18, wherein the light source comprises at least one light emitting diode.

Example 20 includes the camera system of Example 19, wherein the at least one light emitting diode includes at least one visible band light emitting diode and/or at least one infrared light emitting diode.

Example 21 provides a camera system comprising: an image sensor; a light source configured to emit light to illuminate at least a portion of a field of view of the image sensor, the light source being positioned relative to the image sensor such that an angle of incidence of the light at first objects that are within the field of view of the image sensor and positioned less than a selected distance from the image sensor is greater than or equal to a threshold angle of incidence at which reflections of the light from the first objects are orthogonal to the field of view of the image sensor; at least one processor; and a data storage device storing instructions that when executed by the at least one processor cause the camera system to illuminate a scene using the light source, acquire a plurality of images of the scene using the image sensor, and process at least two of the images to detect motion of a second object within the field of view of the image sensor, the second object being further from the image sensor than the selected distance.

Example 22 includes the camera system of Example 21, wherein the selected distance is in a range of 1.5 to 4 inches.

Example 23 includes the camera system of Example 22, wherein the selected distance is 2 inches.

Example 24 includes the camera system of any one of Examples 21-23, further comprising a passive infrared detector, and a battery coupled to the passive infrared detector, the image sensor, light source, the data storage device, and the at least one processor.

Example 25 provides a device comprising: an image sensor; a light source positioned relative to the image sensor so that light from the light source is reflected away from the image sensor by first objects that are within a field of view of the image sensor, the first objects being positioned less than a selected distance from the image sensor; at least one processor; and a data storage device storing instructions that when executed by the at least one processor cause the device to acquire, with the image sensor, at least one image of a scene based on reflections of the light from the light source, the at least one image depicting a second object but not the first objects, the second object being positioned further from the image sensor than the selected distance.

Example 26 includes the device of Example 25, wherein the light source is configured to illuminate at least a portion of the field of view of the image sensor.

Example 27 includes the device of one of Examples 25 or 26, wherein the data storage device storing instructions that when executed by the at least one processor cause the device to process the at least one image to detect the second object.

Example 28 includes the device of any one of Examples 25-27, wherein to acquire the at least one image of the scene comprises to acquire, with the image sensor, a plurality of images of the scene based on the reflections of the light, and wherein the data storage device stores instructions that when executed by the at least one processor cause the device to process at least two images of the plurality of images to detect motion of the second object.

Example 29 includes the device of any one of Examples 25-28, further comprising a housing, the image sensor being disposed at least partially within the housing.

Example 30 includes the device of Example 29, wherein the light source is attached to the housing.

Example 31 includes the device of Example 29, wherein the light source is disposed at least partially within the housing.

Example 32 includes the device of any one of Examples 25-31, wherein the light source is positioned at least a minimum horizontal distance from the image sensor, wherein the minimum horizontal distance is determined based on the selected distance and a horizontal half angle of the field of view of the image sensor.

Example 33 includes the device of any one of Examples 25-31, wherein the light source is positioned at least a minimum vertical distance from the image sensor, wherein the minimum vertical distance is determined based on the selected distance and a vertical half angle of the field of view of the image sensor.

Example 34 includes the device of any one of Examples 25-33, wherein the selected distance is 2 inches.

Example 35 includes the device of Example 34, wherein the light source is positioned in a range of 3 inches to 5 feet away from the image sensor.

Example 36 includes the device of Example 35, wherein the light source is positioned in a range of 3.5 inches to 4.5 inches away from the image sensor.

Example 37 includes the device of any one of Examples 25-36, wherein the light source comprises at least one light emitting diode.

Example 38 includes the device of any one of Examples 25-37, further comprising a motion detector, wherein the light source and the image sensor are configured to transition from an inactive state to an active state based on detection of motion by the motion detector.

Example 39 includes the device of Example 38, wherein the motion detector is a passive infrared sensor.

Example 40 includes the device of one of Examples 38 or 39, further comprising a battery configured to supply operating power for the motion detector, the light source, and the image sensor.

Example 41 provides a method comprising: illuminating an area within a field of view of an image sensor using a light source, the image sensor being part of a device that includes the light source, and the light source being positioned with respect to the image sensor so that light from the light source is reflected away from the image sensor by first objects that are positioned within a field of view of the image sensor and less than a selected distance from the image sensor; acquiring, based on reflections of the light from the light source received by the image sensor, a one or more images from the image sensor, the one or more images depicting a second object but not the first objects; and detecting the second object based on at least one of the plurality of images, the second object being further from the image sensor than the selected distance.

Example 42 includes the method of Example 41, wherein detecting the second object comprises detecting, based on at least two of the plurality of images, motion of the second object without detecting motion of the first objects.

Example 43 includes the method of one of Examples 41 or 42, further comprising selecting the selected distance based on an estimated size of the first objects.

Example 44 includes the method of any one of Examples 41-43, further comprising: detecting the second object with a passive infrared detector; and activating the light source and the image sensor based on detection of the second object with the passive infrared detector.

Example 45 provides a device comprising: a housing; an image sensor disposed at least partially within the housing; and a light source disposed at least partially within the housing or attached to the housing, the light source configured to emit light to illuminate at least a portion of a field of view of the image sensor; wherein the image sensor is configured to acquire images of first objects within the field of view based on receiving reflections of the light by the first objects; and wherein the light source is, positioned relative to the image sensor such that reflections of the light by second objects that are within the field of view of the image sensor and positioned less than a threshold distance from the image sensor are not received by the image sensor.

Example 46 includes the device of Example 45, wherein the threshold distance is 2 inches, and wherein the light source is positioned in a range of 3 inches to 5 inches away from the image sensor.

Example 47 includes the device of one of Examples 45 or 46, wherein the light source is positioned at least a minimum horizontal distance from the image sensor, wherein the minimum horizontal distance is determined based on the threshold distance and a horizontal half angle of the field of view of the image sensor.

Example 48 includes the device of any one of Examples 45-47, wherein the light source is positioned at least a minimum vertical distance from the image sensor, wherein the minimum vertical distance is determined based on the threshold distance and a vertical half angle of the field of view of the image sensor.

Example 49 includes the device of any one of Examples 45-48, wherein the light source is positioned in a range of 3.5 inches to 4.5 inches away from the image sensor.

Example 50 includes the device of any one of Examples 45-49, wherein the threshold distance is 2 inches.

Example 51 includes the device of any one of Examples 45-50, further comprising a motion detector, wherein the light source and the image sensor are configured to transition from an inactive state to an active state based on detection of motion by the motion detector.

Example 52 includes the device of Example 51, wherein the motion detector is a passive infrared sensor.

Example 53 includes the device of one of Examples 51 or 52, further comprising a battery configured to supply operating power for the motion detector, the light source, and the image sensor.

Example 54 includes the device of any one of Examples 45-53, wherein the light source comprises at least one light emitting diode.

Example 55 includes the device of Example 54, wherein the at least one light emitting diode includes at least one visible band light emitting diode and/or at least one infrared light emitting diode.

As will be appreciated in light of this disclosure, modifications are possible in the described embodiments, and other embodiments are possible, within the scope of the claims.

The invention claimed is:

1. A device comprising:
   an image sensor;
   a light source positioned relative to the image sensor so that light emitted by the light source is reflected away from the image sensor by particles that are within a field of view of the image sensor, the particles being positioned less than a selected distance from the image sensor;
   at least one processor; and
   a data storage device storing instructions that when executed by the at least one processor cause the device to acquire, with the image sensor, at least one image of a scene based on reflections of the light from the scene, the at least one image depicting an object in the scene but not the particles, the object being positioned further from the image sensor than the selected distance.

2. The device of claim 1, wherein to acquire the at least one image of the scene comprises to acquire, with the image sensor, a plurality of images of the scene based on the reflections of the light; and
   wherein the data storage device stores instructions that when executed by the at least one processor cause the device to process at least two images of the plurality of images to detect motion of the object.

3. The device of claim 1, further comprising a housing, the image sensor being disposed at least partially within the housing.

4. The device of claim 3, wherein the light source is attached to the housing.

5. The device of claim 3, wherein the light source is disposed at least partially within the housing.

6. The device of claim 1, wherein the light source is positioned at least a minimum horizontal distance from the image sensor, wherein the minimum horizontal distance is determined based on the selected distance and a horizontal half angle of the field of view of the image sensor.

7. The device of claim 1, wherein the light source is positioned at least a minimum vertical distance from the image sensor, wherein the minimum vertical distance is determined based on the selected distance and a vertical half angle of the field of view of the image sensor.

8. The device of claim 1, wherein the selected distance is 2 inches.

9. The device of claim 8, wherein the light source is positioned in a range of 3 inches to 5 feet away from the image sensor.

10. The device of claim 8, wherein the light source is positioned in a range of 3.5 inches to 4.5 inches away from the image sensor.

11. The device of claim 1, wherein the light source comprises at least one light emitting diode.

12. The device of claim 1, further comprising a motion detector;
    wherein the light source and the image sensor are configured to transition from an inactive state to an active state based on detection of motion by the motion detector.

13. The device of claim 12, wherein the motion detector is a passive infrared sensor.

14. The device of claim 12, further comprising a battery configured to supply operating power for the motion detector, the light source, and the image sensor.

15. A method comprising:
    illuminating an area within a field of view of an image sensor using a light source, the image sensor being part of a device that includes the light source, and the light source being positioned with respect to the image sensor so that light emitted by the light source is reflected away from the image sensor by particles that are positioned within a field of view of the image sensor and less than a selected distance from the image sensor;

acquiring, based on reflections of the light that are received by the image sensor, one or more images from the image sensor, the one or more images depicting an object but not the particles, wherein the object reflects at least some of the light to the image sensor; and detecting the object based on at least one of the plurality of images, the object being further from the image sensor than the selected distance.

16. The method of claim 15, wherein detecting the object comprises detecting, based on at least two of the plurality of images, motion of the object without detecting motion of the particles.

17. The method of claim 15, further comprising:
selecting the selected distance based on an estimated size of the particles.

18. The method of claim 15, further comprising:
detecting the object with a passive infrared detector; and
activating the light source and the image sensor based on detection of the object with the passive infrared detector.

19. A device comprising:
a housing;
an image sensor disposed at least partially within the housing; and
a light source disposed at least partially within the housing or attached to the housing, the light source configured to emit light to illuminate at least a portion of a field of view of the image sensor;
wherein the image sensor is configured to acquire images of objects within the field of view based on receiving reflections of the light from the objects; and
wherein the light source is positioned relative to the image sensor such that additional reflections are not received by the image sensor, the additional reflections being reflections of the light from particles that are within the field of view of the image sensor and positioned less than a threshold distance from the image sensor.

20. The device of claim 19, wherein the threshold distance is 2 inches, and wherein the light source is positioned in a range of 3 inches to 5 inches away from the image sensor.

* * * * *